(12) United States Patent
Deneweth et al.

(10) Patent No.: US 10,201,225 B2
(45) Date of Patent: Feb. 12, 2019

(54) RESISTANT SINK BASE CABINET

(71) Applicant: Masco Cabinetry LLC, Adrian, MI (US)

(72) Inventors: Donald Joseph Deneweth, Onsted, MI (US); Shannon Lafferty, Aurora, OH (US); Chris Brozina, Cambridge (CA)

(73) Assignee: Masco Cabinetry LLC, Adrian, MI (US)

( * ) Notice: Subject to any disclaimer, the term of this patent is extended or adjusted under 35 U.S.C. 154(b) by 0 days.

(21) Appl. No.: 14/849,837

(22) Filed: Sep. 10, 2015

(65) Prior Publication Data

US 2016/0058179 A1 Mar. 3, 2016

Related U.S. Application Data

(62) Division of application No. 13/344,967, filed on Jan. 6, 2012, now Pat. No. 9,155,384.

(51) Int. Cl.
| | |
|---|---|
| *F16B 12/00* | (2006.01) |
| *A47B 47/00* | (2006.01) |
| *A47B 77/06* | (2006.01) |
| *F16B 12/26* | (2006.01) |
| *B65D 6/24* | (2006.01) |

(Continued)

(52) U.S. Cl.
CPC .......... *A47B 47/0066* (2013.01); *A47B 45/00* (2013.01); *A47B 47/0075* (2013.01); *A47B 47/0091* (2013.01); *A47B 47/042* (2013.01); *A47B 77/06* (2013.01); *A47B 96/00* (2013.01); *A47B 96/201* (2013.01); *B65D 11/1873* (2013.01); *F16B 12/26* (2013.01); *A47B 2220/008* (2013.01); *A47B 2220/0052* (2013.01); *A47B 2230/00* (2013.01); *Y10T 29/49* (2015.01); *Y10T 29/49817* (2015.01); *Y10T 29/49826* (2015.01); *Y10T 29/49995* (2015.01)

(58) Field of Classification Search
CPC . A47B 45/00; A47B 47/0066; A47B 47/0075; A47B 47/0091; A47B 47/042; A47B 77/06; A47B 96/00; A47B 96/201; A47B 2220/0052; A47B 2220/008; A47B 2230/00; F16B 12/26; B65D 11/1873
See application file for complete search history.

(56) References Cited

U.S. PATENT DOCUMENTS

| | | | |
|---|---|---|---|
| 3,021,187 A | 2/1962 | Mitchell | |
| 3,086,546 A | 4/1963 | Brown | |

(Continued)

FOREIGN PATENT DOCUMENTS

| | | |
|---|---|---|
| FR | 2558699 A1 | 5/2014 |
| WO | 2006/083507 A2 | 8/2006 |

*Primary Examiner* — Hanh V Tran
(74) *Attorney, Agent, or Firm* — Carlson, Gaskey & Olds, P.C.

(57) ABSTRACT

A cabinet has a base and a first side wherein one of the base and the first side has a male portion and another of the base and the first side has a female portion for mating with the male portion. The cabinet has a second side, such that the second side may be attached to the base, wherein one of the base and the second side has a male portion and another of the base and the second side has a female portion for mating with the male portion, such that the second side may be attached to the base. The cabinet also has a back for attaching to the first side, the second side and the base.

20 Claims, 5 Drawing Sheets

(51) Int. Cl.
*A47B 47/04* (2006.01)
*A47B 45/00* (2006.01)
*A47B 96/00* (2006.01)
*A47B 96/20* (2006.01)

(56) References Cited

U.S. PATENT DOCUMENTS

| | | |
|---|---|---|
| 3,748,009 A | 7/1973 | Stone |
| 3,902,201 A | 9/1975 | Bobo |
| 4,145,775 A | 3/1979 | Butler |
| 4,453,785 A | 6/1984 | Smith |
| 4,531,645 A | 7/1985 | Tisbo et al. |
| 4,750,794 A | 6/1988 | Vegh |
| 4,782,972 A | 11/1988 | Wenkman et al. |
| 4,880,284 A | 11/1989 | Dickson et al. |
| 4,980,932 A | 1/1991 | Stemples |
| 5,134,729 A | 8/1992 | Shaw |
| 5,287,565 A | 2/1994 | Auman et al. |
| 5,360,263 A | 11/1994 | Nakano et al. |
| 5,368,379 A | 11/1994 | Wrangberth |
| 5,708,991 A | 1/1998 | DeMarco |
| 5,715,860 A | 2/1998 | Horad |
| 5,795,043 A | 8/1998 | Johnson et al. |
| 5,921,646 A | 7/1999 | Hwang |
| 5,951,127 A * | 9/1999 | Smith .................. A47B 87/007 248/909 |
| 6,012,790 A | 1/2000 | Thomas et al. |
| 6,193,340 B1 | 2/2001 | Schenker et al. |
| 6,364,440 B2 | 4/2002 | Donahue |
| 6,385,788 B1 | 5/2002 | Wasielewski |
| 6,412,638 B1 | 7/2002 | Carter |
| 6,823,889 B1 | 11/2004 | Schuster |
| 7,047,574 B2 | 5/2006 | Patterson |
| 7,376,984 B2 | 5/2008 | Molter |
| 2002/0109442 A1 | 8/2002 | Hsu |
| 2003/0230957 A1 | 12/2003 | Doerfler et al. |
| 2006/0168716 A1 | 8/2006 | Schuster et al. |
| 2006/0168717 A1 | 8/2006 | Schuster et al. |
| 2008/0042532 A1 | 2/2008 | Crabtree |
| 2008/0224581 A1 | 9/2008 | Minerva |
| 2011/0156546 A1 | 6/2011 | DeBoer et al. |
| 2011/0215683 A1 | 9/2011 | Nakasuji |

* cited by examiner

RESISTANT SINK BASE CABINET

CROSS-REFERENCE TO RELATED APPLICATION

This application is a divisional of U.S. patent application Ser. No. 13/344,967, filed Jan. 6, 2012.

BACKGROUND

Assembling cabinets used in kitchens, baths and other areas of the home or office may be a difficult task. In a factory, a typical cabinet assembly operation may require attaching cleats that hold a cabinet bottom and/or top by screwing, gluing or stapling them to a pair of side portions. A back portion may then be attached to the side portions while holding the side portions erect in fixtures or the like. The bottom and top portion (if any) may then attach to the cleats. This process can be very complex, time consuming and require a plurality of specialized fixtures, jigs and tooling.

Cabinets that are sold in flat packs for assembly by end users are also sometimes difficult to assemble because of the plethora of different parts that may be provided to assemble the cabinet, hard to follow directions, varying manufacturing tolerances and ways in which mistakes might be made.

SUMMARY

According to an embodiment disclosed herein, a cabinet has a base and a first side wherein one of the base and the first side has a male portion and another of the base and the first side has a female portion for mating with the male portion. The cabinet has a second side, such that the second side may be attached to the base, wherein one of the base and the second side has a male portion and another of the base and the second side has a female portion for mating with the male portion, such that the second side may be attached to the base. The cabinet also has a back for attaching to the first side, the second side and the base.

According to a further embodiment disclosed herein, a method of constructing a cabinet, includes the steps of providing a first side having a male portion or a female portion, providing a second side having a male portion or a female portion providing a base, the base having, on two portions thereof, a complementary male portion or a female portion to the first side male portion or a female portion and to the second side male portion or a female portion, sliding the male portion or the female portion of the first side onto the complementary male portion or female portion of the base and, sliding the male portion or the female portion of the second side onto the complementary male portion or female portion of the base.

According to a further embodiment disclosed herein, a method of constructing a cabinet includes the steps of determining cabinet width, depth, or height, adding or subtracting inserts to create such width, depth or height and manufacturing the sides, back and bottom of the cabinet with or without the inserts depending on the determination.

These and other features of the present invention can be best understood from the following specification and drawings, the following of which is a brief description.

DETAILED DESCRIPTION

Figure 1:
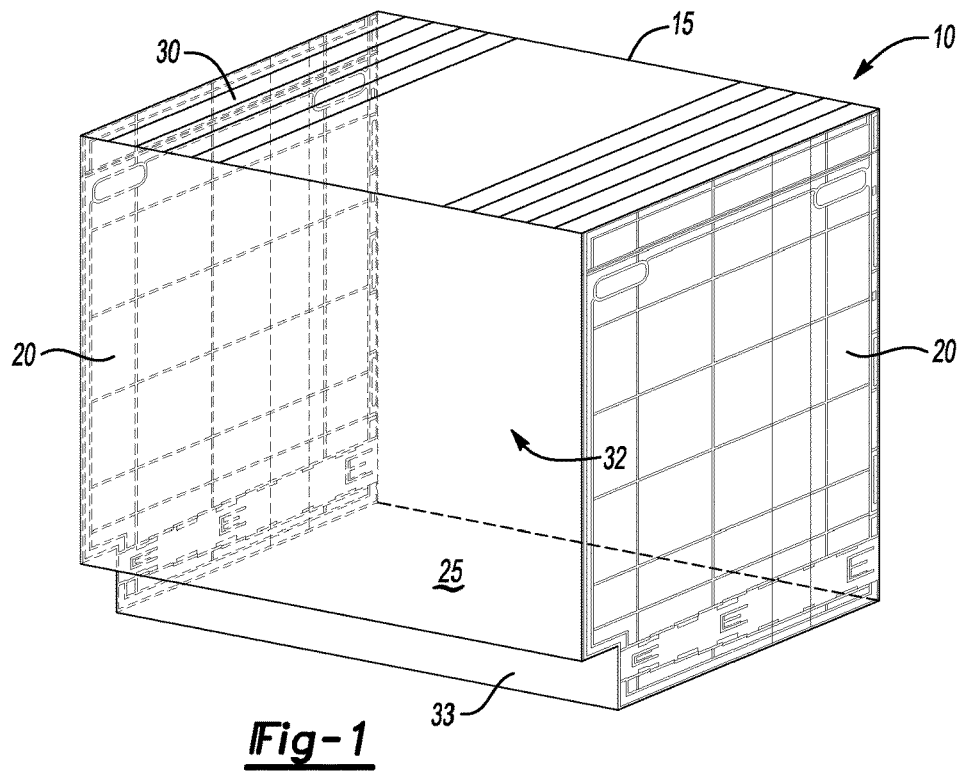
FIG. 1 shows a schematic view of cabinet.

Referring now to FIG. 1, a cabinet 10 is shown. The cabinet has a back 15, sides 20 and a base 25. As is known in the art, a top 30 may be provided to cover the sides 20 and the back 15. Also a front 32 and a kick plate 33 may enclose the front of the cabinet 10, as is known in the art. Though the cabinet 10 is quite robust, the addition of a top 30, a front 32 and a kick plate 33 will further stiffen the cabinet 10 for use. The kick plate 33 and the front 32 may be made of a separate material, like wood, fiberboard or the like from the back 15, sides 20 and base 25, which are made of recyclable plastic.

Figure 2:
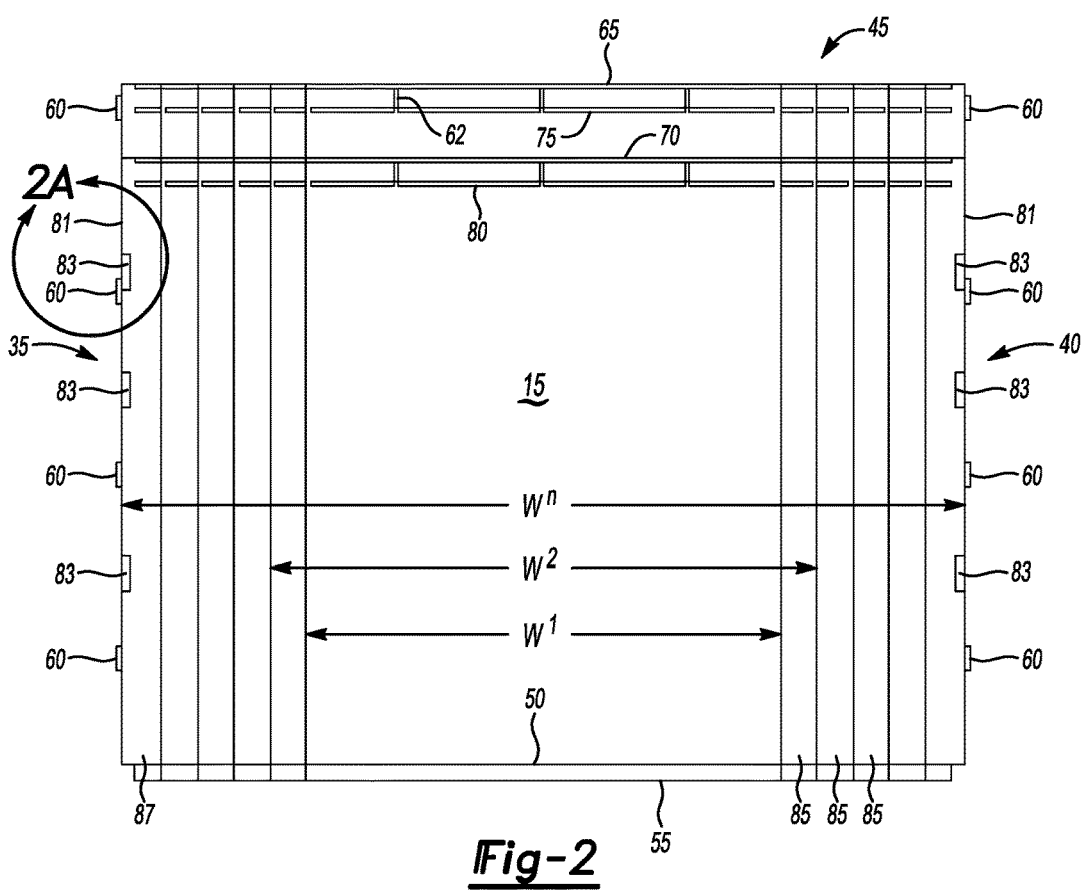
FIG. 2 shows details of the back of the cabinet as shown in FIG. 1.

Referring now to the back 15 of the cabinet 10 shown in FIG. 2, the back 15 has a left side 35, a right side 40, a back top 45, a back bottom 50 and an elongated key 55 for securement to the base 25 as will be discussed infra. Flexible lock tabs 60 extend outwardly from the left side 35 and the right side 40 for attaching the back 15 to the sides 20 as will be discussed herein. The back 15 has an upper support rail 65 and a lower support rail 70. The upper support rail 65 has upper molded supports 75 to support the upper support rail 65 and the lower support rail 70 has lower molded supports 80. The molded supports 75 and 80 provide enough support to the upper support rail 65 and the lower support rail 70 to support a top 30 should it be placed thereupon given the normal weight requirements of the top 30. One of ordinary skill in the art will recognize that these lower support rails 70 and lower molded supports 80 may have other designs than those shown. One of ordinary skill in the art will recognize that more than two rails may be used into the back 15.

Figure 2A:
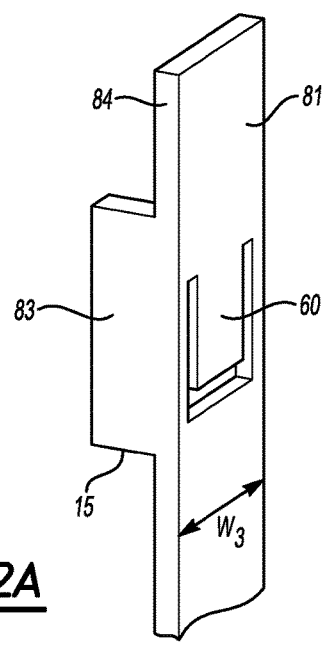
FIG. 2A shows details of a portion of the back of FIG. 2

Referring now to FIG. 2A, the left side 35 and the right side 40 each have a longitudinal stile 81, extending towards the front 32, from which each flexible lock tab 60 extends. Stile 81 has a width $W_3$. Each stile 81 has a rigid flap 83 extending from a side 84 towards the other side of the back 15. The stile 81 and rigid flap cooperate with each side 20 to lock the parts together.

Should a cabinet be desired that has a lower height, the upper support rail 65 may be removed and the lower support rail 75 be used to hold the top 30. In this way, a back 15 may be molded once for two heights and then through a simple cutting step be able to be used for a lower height. Because the plastic back 15 is recyclable, the part that may be removed above the lower support rail 75 may then be recycled. One of ordinary skill in the art will recognize that more than two rails may be used into the sides 20.

As shown by the widths $W^1$, $W^2$ and $W^N$, a cabinet may have different widths and may be manufactured with these widths. The manufacturer may add tooling inserts (not shown but are a negative of the shape 85 of the back 15) to a mold (not shown) to extend the width of the back 15 when constructing the backs. By adding tooling inserts (not shown) to the mold (not shown), the width $W^N$ of the back 15 can be extended by the number of shapes 85 that are added. In the present case, each shape 85 is about 1½" wide so the back is extended about 12" by the 8 shapes. The end portions 87 hold the lock tabs 60, as will be discussed infra. One of ordinary skill in the art will also recognize that inserts may also be added to the sides 20 to determine how deep the cabinet should be and to the base 25 to conform to the sides 20 and back 15.

Figure 3:
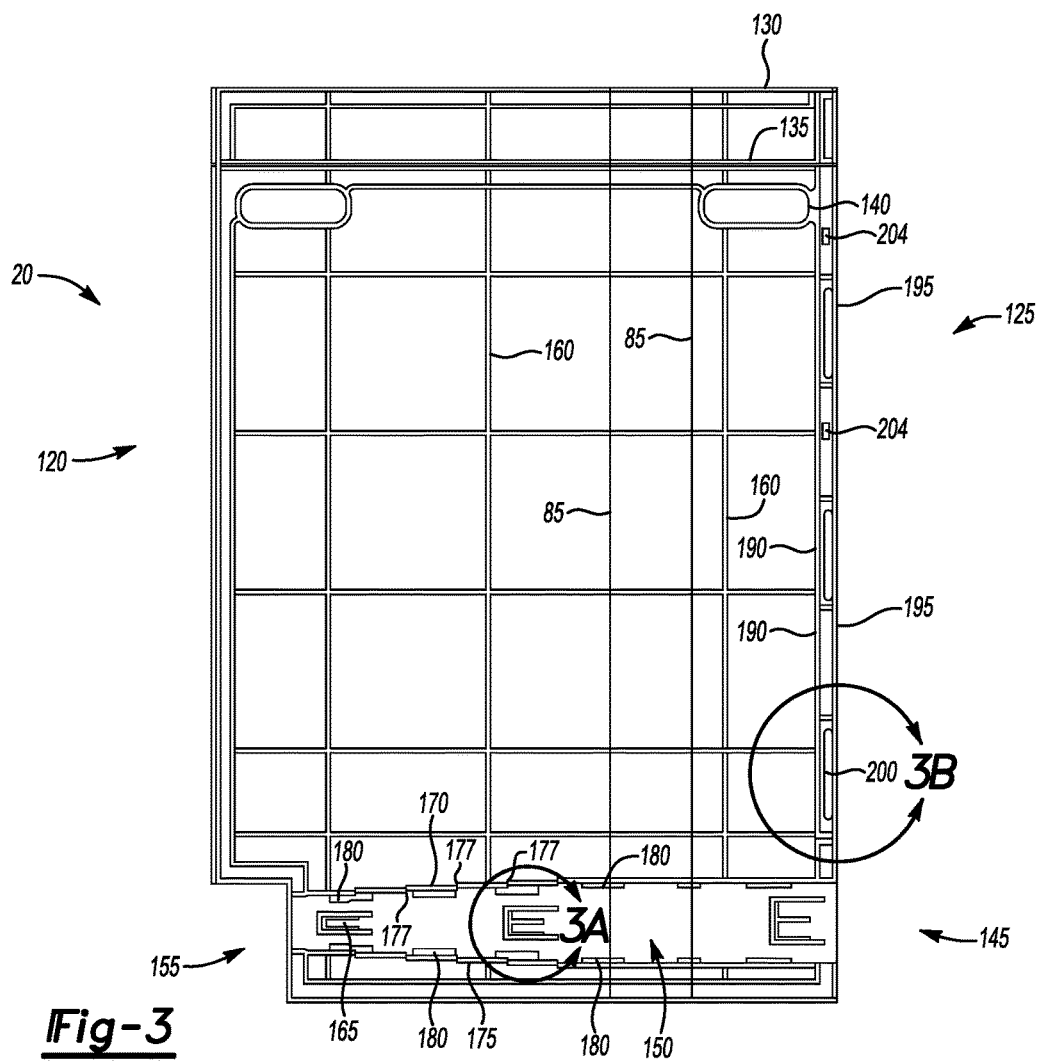
FIG. 3 is shows a side view of a side of the cabinet as shown in FIG. 1.
Figure 3A:
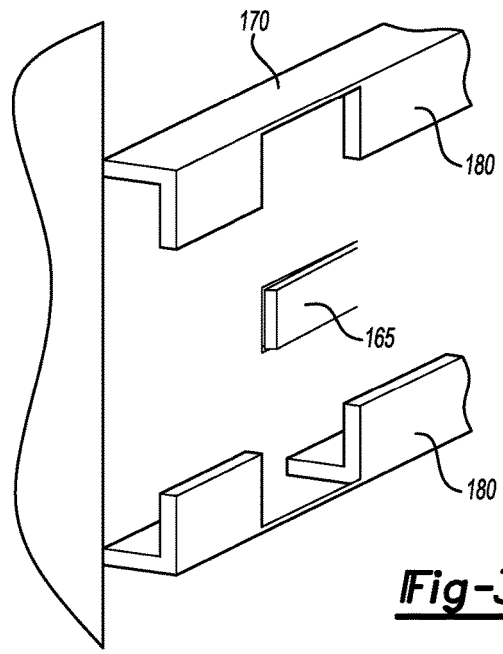
FIG. 3A shows a section of the side as shown in FIG. 3.
Figure 3B:
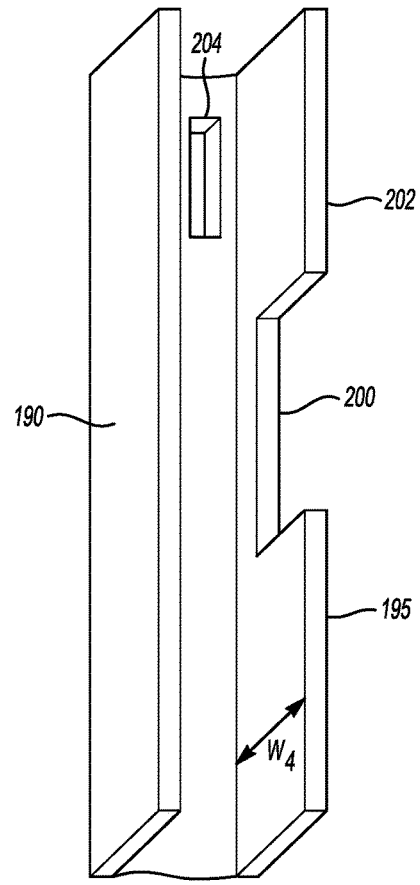
FIG. 3B shows another section of the side as shown in FIG. 3.

Referring now to FIGS. 3, 3A, and 3B, each side 20 has a side front 120, a side back 125, a side upper top 130, a side lower top 135, hand holds 140 adjacent the side lower top 135, side bottom 145, bottom lock rail 150 and kick cutout 155 and stiffening supports 160. Each side 20 is molded of one piece of recyclable plastic. One of ordinary skill in the art will recognize that the support ridges 160 may have other shapes and contours to support the weight of the top 30 and material that may be placed in the base 25 that abuts the sides 20. The side bottoms 145 hold the cabinet 10 above the ground. The kick cutout 155 allows the kick plate 33 to be installed at a front 120 of the cabinet 10 should such kick plate 33 be desired.

As with the back 20, should a cabinet 10 be desired that has a lower height, the side upper top 130 may be removed and the side lower top 135 may be used to hold the top 30. In this way, a side 20 may be molded once for two heights and then through a simple cutting step be able to be used for a lower height. Because the plastic sides 20 are recyclable, the part that may be removed above the side lower top 135 may then be recycled.

The bottom lock rail 150 of each side 20 receives a dovetail slide 205 from the base 25 as will be discussed infra (see FIGS. 4 and 5). The bottom lock rail 150 has lock tabs 165, which extend inwardly towards the other side 20, an upper rail 170, and a lower rail 175. The upper rail 170 and the lower rail 175 may be stepped towards each other from the side back 125 towards the side front 120 to receive the back 15 from the side back 125. By stepping the upper rail 170 and the lower lock rail 175 to create a convergent path, misassembly of the cabinet 10 is less likely to occur. If the upper rail 170 and the lower rail 175 were equal distantly apart along their lengths, the base 25 might be inserted in either direction which might cause an assembly error. The tabs 180 (also FIG. 3A) extend from one lock rail towards the other lock rail.

On the side back of 125 there is a longitudinal inner ridge 190, and a longitudinal outer ridge 195 and a plurality of lugs 200 extending from the outer surface 202 of the longitudinal outer ridge towards the longitudinal inner ridge 190 to receive the back 15 therebehind. The longitudinal outer ridge 195 has a width $W_4$. A plurality of openings 204 receive the tabs 60 from the back 15 as will be discussed infra.

Figure 4:
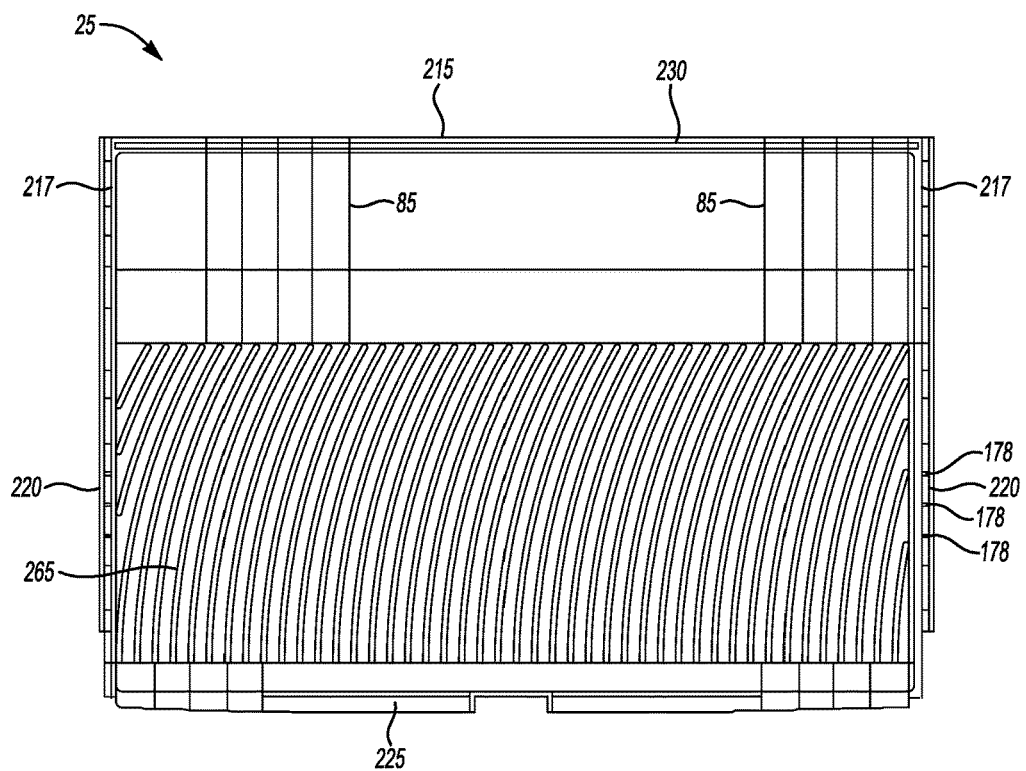
FIG. 4 shows a top view of the bottom of the cabinet of FIG. 1.
Figure 5:
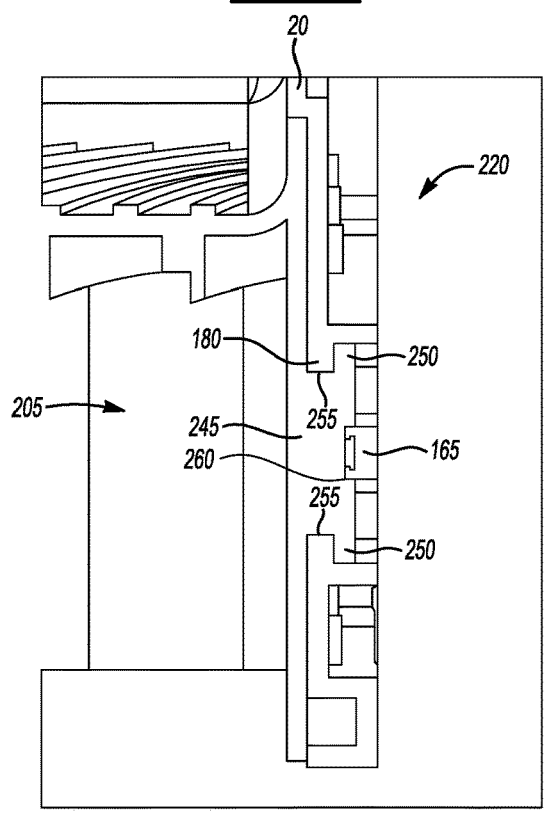
FIG. 5 shows a connection between the side of FIG. 3 and the base of FIG. 4.

Referring now to FIG. 4, base 25 is shown. The base 25 has a back edge 215, a pair of sides 217 each of which having a male portion 220 extending therefrom for mating with the upper rails 170 and the lower rails 175 in the sides 20 as will be discussed infra. The male portion 220 has a body 245 with upper and lower flanges 250 that create upper and lower grooves 255 that mate with the bottom lock rail 150 of the sides 20. The lock tabs 165 extend into openings 260 in the body 245 between the grooves 255 to secure fastening of the sides 20 to the base 25. The male portion 220 may also be stepped like the upper rails 170 and the lower rails 175, which act as a female portion, to mate therewith. Because of the direction of the tapered portions, misassembly of the sides 20 and the base is not possible. One of ordinary skill in the art will recognize that the rails (e.g., the female portion) may be on the sides 20 and the male portion may be on the base 25.

By leveraging the lock tabs 165 from the outside of the sides 20, the base 25 may be removed from sides 20. This feature may be particularly important in countries where people, when leaving an apartment or home, take fixtures like cabinets, with them. Deconstruction of the cabinet 10 is therefore desirable.

The base 25 has a textured surface 265 to keep products dry in areas where the base 25 might be wet. The base 25 may be angled from the back edge 215 towards the base front 225 to allow leakage to escape out of the base front 225.

Figure 6:
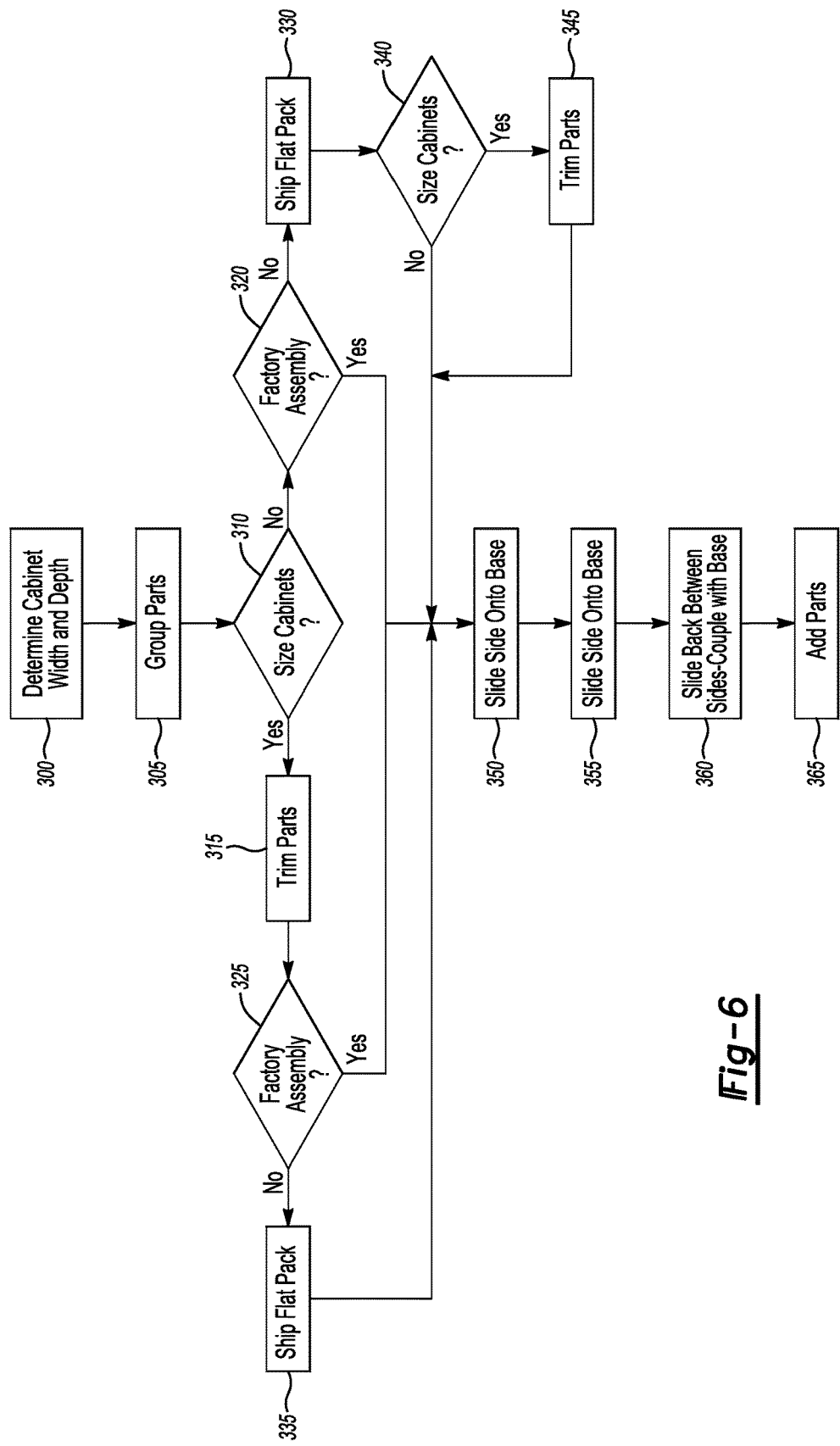
FIG. 6 shows a method of constructing and deconstructing a cabinet of the Figures.

Referring to FIG. 6, to assemble the cabinet either by a consumer or an installer in a home or business, or at the factory, it is first determined how wide and deep the cabinet should be (step 300). The sides 20, base 25 and back 15 are removed from molds (not shown) and grouped for assembly (step 305). In step 310, it is determined whether the cabinets are to be trimmed to size. If so, the back 15 and sides 20 may be shortened by removing the upper support rail 65, and the lower support rail 75 be used to hold the top 30, and by removing the side upper top 130, and the side lower top 135 may be used to hold the top 30, respectively. The sides 20 may be trimmed to size and the back 15 may be trimmed to fit the sides 20 and the back 15 (step 315). This trimming occurs in the factory.

If trimming is not required, it is determined whether factory assembly is required in steps 320 and 325. If not, a flat pack is sent to an end user, an installer, or to a store like a big box store or others for sale to an end user in steps 330 and 335. Flat packs, in which the parts are laid flat atop each other, typically within a box, are a very efficient way to ship product especially compared to a constructed cabinet which takes up a much larger volume. If an untrimmed flat pack is shipped in step 330, a user still has the option in step 340 to trim the parts. If the parts are to be trimmed to be the desired size, this occurs, as in step 315, in step 345. This step 345 may be taken by an installer or other user.

In step 350, the male portion 220 of the base 25 is slid in between the upper rails 170 and the lower rails 175 in a side 20. The lock tabs 165 engage openings 260 to lock the base to the side 20. The upper rail and the lower rail 170 and 175 fit within grooves 255. The male portion 220 is inserted until shoulders 177 of the stepped rails 170, 175 mate with the respective steps 178 of the male portion 220. The process is then repeated in step 355 for the other side 20 of the cabinet 10.

In step 360, the back 15 is then attached to the sides 20 and the base 25. The stile 81 is slid downwardly between the inner ridge 190 and outer ridge 195 of the sides 20 until the top 45 or 50 of the back 15 is flush with the top of the sides 20 either the side upper top 130 or the side lower top 135. The lock tabs 60 then flex out into the lock openings 204 to maintain the back 15 and register with the sides 20. Because the width $W_3$ of the stile 81 is less than the width $W_4$ of the outer ridge 195, each flap 83 is disposed behind each lug 200 if the back is fully inserted as discussed herein. As the stiles continue to slide downwardly, the key 55 is disposed within the slot 230 of the base 15 at which point the back is fully inserted. In step 365, other parts, like a front 32, a kick plate 33 or a top 30, may then be attached to the cabinet 10 as is known in the art.

The cabinet may be deconstructed in reverse order of the steps shown above. The parts are removed, the lock tabs 60 are removed from lock openings 204, the back 15 is slid out from between the sides 20, and the lock tabs 165 of the sides 20 disengage openings 260 to unlock the male portion 220 from the sides to slide the male portion from between the upper and lower rail 170 and 175 to complete the deconstruction.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of constructing cabinets, said method comprising:
   providing a cabinet base, side walls, and a back wall, defining at least one of the cabinet base, side wall, or back wall to have at least one minimum dimension of width or depth;
   providing one or more shapes to increase the at least one minimum dimension of the at least one of the cabinet base, side wall, or back wall to provide a selection of one or more different cabinet widths or depths;
   selecting a desired cabinet width and depth from the selection of the plurality of different cabinet widths and depths; and
   forming at least one of the cabinet base, side wall, or back wall to create the desired width and depth by adding the shapes to increase the minimum dimension where needed.

2. The method of claim 1 further comprising:
   trimming said side walls and said back wall to decrease the height of the cabinet when a shorter cabinet is needed.

3. The method of claim 2 further comprising:
   shipping a flat pack of at least one of said side walls, back wall and base.

4. The method of claim 3 further comprising assembling said cabinet by sliding said side walls onto said base and sliding said back wall between said side walls and into said base.

5. The method of claim 4 further comprising disassembling said cabinet to be reassembled at a different location.

6. The method of claim 1 wherein the minimum dimension of the back wall comprises the cabinet width, and wherein each shape increases the cabinet width by a predetermined amount until the desired cabinet width is achieved.

7. The method of claim 1 wherein the minimum dimension of the back wall comprises the cabinet width, and including adding a plurality of shapes to increase the cabinet width to a maximum dimension with the back wall including a plurality of selectable cabinet widths.

8. The method of claim 7 including selecting the desired width to be greater than the minimum dimension and less than the maximum dimension, and adding one or more shapes to the back wall having the minimum dimension to achieve the desired width.

9. The method of claim 1 wherein the minimum dimension of the back wall defines an initial cabinet width, and wherein each shape increases the cabinet width by a predetermined amount, and wherein one end portion is positioned at each edge of the back wall such that the desired cabinet width is determined based on a summation of the initial cabinet width, plus a width of each shape, plus a width of each end portion, and wherein each end portion includes a stile with a lock tab and flap that is used to attach the back wall to the side walls.

10. A method of constructing cabinets comprising:
    determining at least one of a desired cabinet width and a cabinet depth for a finished cabinet;
    providing sides, a back, and a bottom to form the finished cabinet;
    providing shapes to adjust at least one of cabinet width and cabinet depth; and
    using the shapes with the sides, back, or bottom as needed to form the finished cabinet.

11. The method of claim 10 further comprising:
    adding the shapes to said sides, said back or said bottom to meet width or depth requirements.

12. The method of claim 11 further comprising:
    shipping a flat pack of the sides, back, bottom, and shapes.

13. The method of claim 12 further comprising sliding the sides onto the base, and sliding the back between the sides and into the base to form the finished cabinet.

14. The method according to claim 13 including providing a stile at each side of the back wherein each stile includes a lock tab and a flap, and wherein attaching the back to the sides further includes sliding the stiles on the back downwardly between ridges of the sides until the lock tabs are received within corresponding lock openings in the sides, the flaps extend along the back, and a top of the back is flush with a top of the sides.

15. A method of constructing cabinets, said method comprising:
    (a) providing sides, a base and a back for a cabinet wherein the sides, base, and back are configured to each have a minimum dimension;
    (b) determining how high, wide, and deep the cabinet should be;
    (c) determining whether the back, base and sides are to be adjusted from the minimum dimension based on step (b);
    (d) adding shapes to the sides, base or back to increase the depth or width from the minimum dimension to achieve a desired depth and width; and
    (e) shortening the back and sides by removing at least one top rail from the back and at least one top portion from the sides to reduce a cabinet height dimension when a shorter cabinet is needed.

16. The method according to claim 15 including assembling the cabinet by sliding a male portion of the base between rails in the sides, and then attaching the back to the sides and the base by sliding the back in a downward direction toward the base.

17. The method according to claim 16 wherein attaching the sides to the base further includes inserting the male portion until shoulders of stepped areas on the rails mate with the respective steps of the male portion, and having lock tabs engage openings in the base to lock the base to the side.

18. The method according to claim 17 wherein attaching the back to the sides further includes sliding a stile on the back downwardly between ridges of the sides until a top of the back is flush with a top of the sides.

19. The method according to claim 18 wherein each stile includes a lock tab and a flap, and wherein sliding the stile further includes sliding the stile downwardly until the lock tab is received within a corresponding lock opening in one of the sides and the flap extends along the back.

20. The method of claim 15 wherein the minimum dimension of the back defines an initial cabinet width, and wherein each shape increases the cabinet width by a predetermined amount, and wherein one end portion is positioned at each edge of the back wall such that the desired cabinet width is determined based on a summation of the initial cabinet width, plus a width of each shape, plus a width of each end portion, and wherein each end portion includes a stile with a lock tab and flap that is used to attach the back to the sides.

* * * * *